Darlington

United States Patent [19]

[11] 4,176,022
[45] Nov. 27, 1979

[54] REMOVAL OF PART PER BILLION LEVEL HARDNESS IMPURITIES FROM ALKALI METAL CHLORIDE BRINES

[75] Inventor: William B. Darlington, Portland, Tex.

[73] Assignee: PPG Industries, Inc., Pittsburgh, Pa.

[21] Appl. No.: 900,457

[22] Filed: Apr. 27, 1978

[51] Int. Cl.$^2$ .................. C25B 1/16; C25B 1/26; C01F 25/32
[52] U.S. Cl. .................. 204/98; 204/128; 423/300; 423/301; 423/305; 423/158
[58] Field of Search ............ 423/158, 464, 300, 301, 423/305, 309, 323; 204/98, 128

[56] References Cited

U.S. PATENT DOCUMENTS

| | | | |
|---|---|---|---|
| 3,163,599 | 12/1964 | Salutsky et al. | 423/158 |
| 3,793,163 | 2/1974 | Dotson | 204/98 |
| 4,038,365 | 7/1977 | Patil et al. | 204/98 |

FOREIGN PATENT DOCUMENTS 44-1683  1/1969  Japan ..................... 423/158

*Primary Examiner*—R. L. Andrews
*Attorney, Agent, or Firm*—Richard M. Goldman

[57] ABSTRACT

Disclosed is a method of electrolyzing an alkali metal chloride brine in an electrolytic cell by feeding an aqueous alkali metal chloride brine containing less than 20 parts per billion dissolved alkaline earth metal ions, e.g., calcium, to the anolyte compartment of an electrolytic cell. Also disclosed is an alkali metal chloride brine containing less than 20 parts per billion of alkaline earth metal ions, e.g., calcium ion. There is also disclosed a method of purifying alkaline earth metal-containing brines, e.g., calcium-containing brines, by maintaining the brine alkaline, adding a phosphate to the alkaline brine whereby to form a calcium compound substantially insoluble in brine and thereafter separating the compound from the brine.

32 Claims, No Drawings

REMOVAL OF PART PER BILLION LEVEL HARDNESS IMPURITIES FROM ALKALI METAL CHLORIDE BRINES

DESCRIPTION OF THE INVENTION

Chlorine and caustic soda are commercially produced by the electrolysis of alkali metal chlorides, e.g., sodium chloride and potassium chloride, in an electrolytic cell having an anolyte compartment separated from a catholyte compartment by a semi-permeable barrier therebetween. The brine is fed to the anolyte compartment and chlorine is evolved at the anode according to the reaction:

$$Cl^- \rightarrow \tfrac{1}{2}Cl_2 + e^-.$$

The alkali metal ion, either potassium ion or sodium ion, passes through the semi-permeable barrier which may either be an electrolyte permeable diaphragm, a microporous diaphragm, or an electrolyte impermeable, cation-permeable, permionic membrane. In the catholyte compartment, hydroxyl ion is produced and an alkali metal hydroxide solution is recovered.

In order to provide high levels of cell performance, impurities that would interfere with the functions of the anode, the barrier, and the cathode must be removed from the brine before the brine is fed to the cell. This is normally accomplished by treating the brine with soda ash and sodium hydroxide to precipitate a major portion of the calcium and magnesium impurities present in the brine. Thereafter, the brine is physically separated from the precipitates, for example, by settling, decantation, filtration or other physical separation. The resulting brine, having a total alkaline earth metal content, principally calcium, but also magnesium and strontium, of above about 2 or 3 parts per million, is satisfactory for use in electrolytic cells where the barrier is an asbestos diaphragm.

However, in electrolytic cells where the semi-permeable barrier is a microporous diaphragm or a permionic membrane, it is necessary to reduce the alkaline earth metal impurity levels in the brine to parts per billion levels. For electrolytic cells having a microporous synthetic membrane, a brine having a tolerable level of alkaline earth metal ion impurities may be prepared by passage through an ion exchange column, thereby obtaining a brine containing less than about 500 parts per billion (0.5 parts per million) of total alkaline earth metals, which alkaline earth metal impurities are predominantly calcium but also include lesser amounts of magnesium and strontium.

In order to obtain optimum performance of electrolytic cells where the barrier is a cation selective permionic membrane and to extend the period of optimum operation of electrolytic cells having a microporous diaphragm, total alkaline earth metal ion impurity levels below about 20 parts per billion (0.02 parts per million) are desirable. This is apparently because alkaline earth metals precipitate within the polymer matrix of the microporous diaphragm or permionic membrane, disturbing and dislocating the polymer network, blocking the pores, and ultimately destroying the membrane.

According to this invention, brines having an alkaline earth metal ion content less than about 20 parts per billion may be prepared. More particularly, such brines are prepared by treating the alkali metal chloride brine effluent from an ion exchange column with phosphate compounds under such conditions as to form insoluble calcium compounds believed to be calcium apatites having the general formula:

$$(CaX_2).(Ca_3(PO_4)_2)_3$$

where X may be fluorine, chlorine, hydroxyl, or combinations thereof.

DETAILED DESCRIPTION OF THE INVENTION

According to the method of this invention, there is provided an alkali metal chloride brine, normally a potassium chloride or a sodium chloride brine, containing less than 20 parts per billion of alkaline earth metal ions which is particularly suitable for electrolysis in an electrolytic cell equipped with a permionic membrane or a microporous diaphragm. As used herein, alkaline earth metal ions refer to calcium, magnesium, and strontium ions, the most prevalent of which is calcium. Removal of a major portion of alkaline earth metal ions from such brines, in accordance with this invention, is accomplished by adding a phosphate to brine contaminated with an alkaline earth metal ion content upwards of 200 parts per billion, usually from 200 to 500 parts per billion, or even a higher content while the brine is maintained alkaline to form an apatite and thereafter separating the brine from the apatite.

Brine containing less than 20 parts per billion is electrolyzed, in accordance with this invention, in an electrolytic cell having an anolyte compartment, a catholyte compartment, and a semi-permeable barrier therebetween. The semi-permeable barrier may be either a microporous diaphragm prepared from synthetic halocarbon resins or a cation selective permionic membrane. Electrolysis in such a cell involves feeding aqueous alkali metal chloride brine to the anolyte compartment of the cell and recovering aqueous alkali metal hydroxide solution from the catholyte compartment and elemental halogen from the anolyte compartment. The method is carried out by maintaining the brine alkaline while adding a phosphate to the brine whereby to form an apatite, separating the brine from the apatite, and thereafter feeding the brine to the cell.

There is also disclosed herein, a method of purifying an alkaline earth metal ion containing alkali metal chloride brine by maintaining the brine alkaline, adding phosphate to the alkaline brine whereby to form an insoluble calcium compound and thereafter separating the precipitate from the brine.

According to this invention, alkaline earth metal ion, especially calcium ion present even in trace amounts, for example, fractional parts per million, i.e., hundreds of parts per billion, is removed from aqueous alkali metal chloride brine solutions usually containing upwards of 200 parts per billion calcium ion by precipitation whereby to provide an alkali metal chloride brine containing less than about 20 parts per billion of alkaline earth metal ions.

The substantially insoluble calcium compounds are believed to be calcium apatites. An apatite is a material substantially insoluble in aqueous alkali metal chloride brines having the stoichiometric formula:

$$(CaX_2).(Ca_3(PO_4)_2)_3$$

where X may be fluorine, chlorine, or hydroxide. Generally, X is either fluorine or hydroxide and most frequently both fluorine and hydroxide, yielding a complex of fluoro-apatite and hydroxy-apatite. Fluoro-apatite is preferred because of its lower solubility.

The substantially insoluble calcium phosphate compound is prepared in and separated from alkaline brine prior to brine feed to the cell. This is accomplished by providing phosphate content in the brine substantially above that required for stoichiometric reaction with the calcium by phosphate addition to the brine. The phosphate may be phosphoric acid, sodium phosphate, potassium phosphate, and mixtures thereof. Phosphates, as used herein, includes both the lower phosphates and the higher phosphates as orthophosphates, metaphosphates, and polyphosphates.

As herein contemplated, the alkaline earth metal content of the brine prior to treatment with the phosphate ion is usually in excess of 200 parts per billion and generally above 400 parts per billion. While the method of this invention is effective with brines having higher concentrations of alkaline earth metal ion, e.g., above about 800 parts per billion, there are alternate, more economical expedients for reducing the alkaline earth metal ion therein, for example, carbonate precipitation of the calcium and hydroxy precipitation of the magnesium to lower the concentration thereof to about 2 parts per million and thereafter treatment of the brine with an ion exchange resin such as a chelating ion exchange resin to further lower the total alkaline earth metal ion concentration to the 400 to 500 parts per billion range.

The pH of the brine is maintained alkaline to precipitate the calcium phosphate compound. Preferably the pH of the brine is maintained above about 10, whereby to further decrease the solubility of the compound formed in the brine. The brine may be maintained alkaline by the addition of sufficient hydroxyl ion, for example, in the form of sodium hydroxide or potassium hydroxide, to raise the pH above about 10 so that it does not fall below a pH of about 10 upon the addition of phosphate or phosphonic acid. Alternatively, phosphate ion or phosphoric acid may be added to the brine, causing the pH to drop to about pH 8 or lower, followed by the subsequent addition of alkali metal hydroxide, to bring the pH back to about 10. However, regardless of the method used to maintain the pH of the brine alkaline, it is particularly important to maintain the pH of the brine alkaline and preferably above about pH 10 during the formation of the insoluble compound and the separation thereof from the brine.

Other additives may be added to the brine in order to assist in the removal of the alkaline earth metal ions. For instance, alkali metal fluoride, such as sodium fluoride or potassium fluoride, may be added whereby to form an even less soluble compound believed to be calcium fluoro-apatite. Calcium fluoro-apatite has a lower solubility than calcium apatite and is therefore preferred for removal of parts per billion level of calcium from the brine.

Additionally, alkaline earth metal salts may be added at the parts per million level, i.e., from about 1 to about 100 parts per million, whereby to form seeds for the precipitation of the insoluble compounds. Typical seeding materials include calcium phosphate, $Ca_3(PO_4)_2$, calcium fluoro-apatite, calcium hydroxy-apatite, and calcium hydroxide. The seeding materials may be added before, during, or after phosphate addition.

Formation of the insoluble compounds will occur at the normal temperature of the brine, which is typically about 40° C. However, the brine may be warmer than 40° C., which temperatures may be provided by using heated phosphate addition or heated brine. Temperatures below about 40° C. are better avoided inasmuch as longer time periods are required for complete precipitation of the product to occur.

Concentrations of the phosphate ion, and fluoride ion when added should be in the substantial excess of the amount required for complete stoichiometric reaction with the calcium. Typically, the concentration of phosphate ion should be from about 0.1 to about 1 weight percent, i.e., from about 0.01 to about 0.1 molar, when treating a brine containing less than about 400 parts per billion of calcium ion. Concentration of fluoride ion should be from about 0.01 to about 0.1 weight percent, that is, from about 0.001 to about 0.01 molar. The concentration of seeding materials, when used, should be at from about 1 to about 100 parts per million.

Residence times, i.e., contact times, of from about 1 to about 16 hours are required at temperatures above about 40° C. and initial calcium ion concentrations of about 200 to 400 parts per billion in order to assure satisfactory calcium removal. Generally, an economic separation of the calcium ions from the alkali metal chloride brine may be obtained in about 5 hours.

The insoluble calcium phosphate formed as described hereinabove is then physically separated from the brine using any known expedient, such as centrifugation, settling, decantation, or filtration. Filtration is especially useful with filter pore sizes small enough to trap apatite crystals. As a practical matter, the pore size should be greater than about 0.4 micron but less than about 1 micron in order to retain the greater portion of calcium phosphate crystals. A particularly desirable range of pore sizes of the filtering media is from 0.45 to about 0.80 micron.

After physical separation of the apatite crystals from the brine, the brine, purified to less than about 20 parts per million of alkali metal ions, predominantly calcium ions, may be fed directly to an electrolytic cell. However, according to a further exemplification of the method of this invention, the brine may be further purified by contacting the substantially alkaline earth metal ion-free brine, i.e., brine containing less than about 20 parts per billion of alkaline earth metal ions with a chelating ion exchange resin to remove further alkaline earth metal ions and obtain a brine containing less than about 2 parts per billion of alkaline earth metal ions predominantly as calcium ions.

Chelating ion exchange resins herein contemplated both for reducing the precipitation purified brine from about 2.3 parts per million (2300 parts per billion) of alkaline earth metal ions to about 200 to 400 parts per billion of alkaline earth metal ion impurities and for reducing the purified brine from about 20 parts per billion alkaline earth impurity to about 2 parts per billion alkaline earth impurity include those having the general formula:

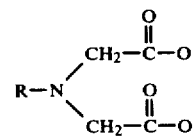

where R is an organic polymer such as styrene, divinylbenzene, styrene butadiene, and epichlorohydrin, among others. The tertiary nitrogen may have one acid or two acid groups thereon such as acetate groups yielding iminodiacetate. Such ion exchange resins includes DOWEX® A-1 and Rohm & Haas AMBERLITE® XE 318 as well as the materials shown in U.S. Pat. No. 4,060,465.

Typically, in the practice of this invention, brine is first filtered to remove particulates and insolubles, following which it is treated with soda ash and alkali metal hydroxide to lower both the concentration of the calcium ion which frequently is on the order of a fraction of a percent, by calcium carbonate precipitation and that of magnesium ion, by magnesium hydroxide precipitation, down to a total alkaline earth metal ion content of about 2 or 3 parts per million, i.e., about 2,000 or 3,000 parts per billion, of total alkaline earth metal ion impurity. After the precipitate is removed, as by filtration, the brine is passed through a chelating ion exchange resin, as described above, to further reduce the alkaline earth metal ion impurity concentration to about 200 to 400 parts per billion (0.2 to 0.4 parts per million) total alkali metal ion impurity concentration. Thereafter, the brine, at a pH of about pH 10 or higher, is contacted with phosphate ion and, optimally with fluoride ion, whereby to form calcium phosphate precipitate believed to be an apatite. The precipitate is physically separated from the brine, for example, by filtration, decantation, or centrifugation, to produce an alkali metal chloride brine containing less than 20 parts per billion of alkaline earth metal ion impurities which alkaline earth metal ion impurities are primarily calcium ion impurities. Thereafter, the brine, containing less than 20 parts per billion of alkaline earth metal ion impurities, may, additionally, be passed through a chelating ion exchange resin to reduce the alkaline earth metal ion impurities thereof to below about 2 parts per billion.

After purification, including precipitation and, if desired or necessary, subsequent ion exchange resin purification, the brine is especially suited for feed brine to a semi-permeable barrier containing chlor-alkali electrolytic cells, especially such cells equipped with permionic membrane barriers. Most frequently, where the part per billion level calcium contents herein contemplated are necessary, the barrier will be either a permionic membrane or a synthetic microporous diaphragm. Cells equipped with any cation selective permionic membrane may be advantageously operated with brine prepared as herein described. Many of these permionic membranes are halocarbon resins having pendant acid, amide, ester, or like groups thereon. The polymeric resin will be a fluorocarbon, chlorocarbon, or fluorochlorocarbon and the pendant acid groups will be sulfonic acid groups, sulfonamide acid groups, carboxylic acid groups, phosphonic acid groups, or phosphoric acid groups. Most commonly, the acid groups will be either sulfonic acid groups or carboxylic acid groups. The necessity of maintaining a low calcium ion concentration, for example, below about 20 parts per billion and preferably below about 2 parts per billion, in the feed brine is dictated by the problem of precipitation of calcium within the pore structure and matrix of the synthetic barrier during electrolysis, resulting in gradual plugging and ultimately gradual destruction of the membrane.

Thus, according to this invention, brine feed containing less than 20 parts per billion of alkaline earth metal ion impurities and preferably less than about 2 parts per billion of alkaline earth metal ion impurities, said alkaline earth metal ion impurities being predominantly calcium with small amounts of magnesium and strontium therein, is fed to the anolyte compartment of the cell. Chlorine is recovered from the anolyte compartment and, according to one mode of operation, depleted brine may be withdrawn therefrom for recirculation and resaturation through a brine treatment system.

A catholyte liquor containing aqueous alkali metal hydroxide, for example, aqueous sodium hydroxide or aqueous potassium hydroxide, is recovered from the catholyte compartment.

The following examples are illustrative.

EXAMPLE 1

A test was conducted to determine the comparative calcium removal abilities from sodium chloride brine of treatment by phosphoric acid followed by sodium fluoride treatment at two levels of sodium fluoride treatment.

Brine was obtained that had previously been treated by sodium carbonate and sodium hydroxide, followed by passage through a chelating ion exchange resin. The resulting brine had the following composition:

| Component | Composition of Brine Concentration |
|---|---|
| NaCl | 300–315 grams per liter |
| $Ca^{++}$ | 700 parts per billon |

The brine was initially at pH 10 but the pH fell to pH 8.6 upon the addition of $H_3PO_4$.

Run A

One liter of the brine was placed in a polyethylene container. To this brine was added 0.4525 gram of 85 percent $H_3PO_4$, 0.1518 gram of NaF, and, as a seed, 0.0487 gram of $Ca_3(PO_4)_2$. The brine was mixed for 16 hours with a magnetic stirrer and filtered through a 0.45 micron Millipore filter. The filtered brine contained 200 parts per billion of calcium.

Run B

One liter of the brine was placed in a polyethylene container. To this brine was added 0.4460 gram of 85 percent $H_3PO_4$ followed by 0.2814 gram of NaF, and, as a seed, 0.1286 gram of $Ca_3(PO_4)_2$. The brine was mixed for 16 hours with a magnetic stirrer and filtered through a 0.45 micron Millipore filter. The filtered brine contained 24 parts per billion of calcium.

Run C

One liter of the brine was placed in a polyethylene container. To this brine was added 2.240 grams of $H_3PO_4$ followed by 0.0843 gram of NaF, and, as a seed, 0.0271 gram of $Ca_3(PO_4)_2$. The brine was mixed for 16 hours with a magnetic stirrer and then filtered through a 0.45 micron Millipore filter. The resulting brine contained 20 parts per billion of calcium.

EXAMPLE 2

A test was conducted to determine the effect of passing prepurified brine through a chelating ion exchange resin column.

Brine was obtained that had previously been treated by sodium carbonate and sodium hydroxide, followed by passage through a chelating ion exchange resin column. The resulting brine had the following composition:

| Composition of Brine | |
|---|---|
| Component | Concentration |
| NaCl | 300–315 grams per liter |
| $Ca^{++}$ | 400 parts per billion |

To 1.2 liters of the brine was added 0.5352 gram of 85 percent $H_3PO_4$ followed by 0.3377 gram of NaF, and, as a seed, 0.1543 gram of $Ca_3(PO_4)_2$ at 74° C. The brine was mixed for 16 hours with a magnetic stirrer and then filtered through a Millipore filter having 0.45 micron pores. The resulting precipitated filtered brine had a calcium ion content of 24 parts per billion.

The precipitated filtered brine was then passed through a 30.5 centimeter by 2.5 centimeter diameter AMBERLITE ® XE 318 diminoacetate chelating ion exchange column at a flow rate of 16 cubic centimeters per minute. The resulting brine had a calcium ion content of 14 parts per billion.

While the invention has been described herein with reference to certain exemplifications and embodiments thereof, it is not to be limited except as in the claims appended hereto.

I claim:

1. A method of electrolyzing an alkali metal chloride brine in an electrolytic cell having an anolyte compartment separated from a catholyte compartment by a semi-permeable barrier which method comprises:
   maintaining a calcium ion containing brine alkaline;
   adding a phosphate chosen from the group consisting of phosphoric acid, sodium orthophosphate, sodium metaphosphate, sodium polyphosphate, potassium orthophosphate, potassium metaphosphate, potassium polyphosphate, and mixtures thereof to said alkaline brine whereby to form an insoluble precipitate having the stoichiomatic formula $(CaX_2) \cdot (Ca(PO_4)_2)_3$ wherein X is chosen from the group consisting of F, Cl and OH;
   separating the precipitate from the brine;
   feeding the brine, containing less than 20 parts per billion of calcium ion, to the anolyte compartment of the cell; and
   passing an electrical current through the cell.

2. The method of claim 1 comprising adding seeding agent to said alkaline brine.

3. The method of claim 2 wherein the seeding agent is chosen from the group consisting of calcium phosphate, calcium fluoro-apatite, calcium hydroxy-apatite, and calcium hydroxide.

4. The method of claim 1 comprising passing the brine through filtering media and recovering a substantially calcium-free brine therefrom.

5. The method of claim 4 wherein said filtering media has a pore size of from about 0.4 to about 1 micron.

6. The method of claim 1 wherein the brine is adjusted to a pH of about 10 prior to addition of the phosphate.

7. The method of claim 1 wherein the phosphate is chosen from the group consisting of phosphoric acid, sodium phosphate, potassium phosphate, and mixtures thereof.

8. The method of claim 1 comprising adding an alkali metal fluoride to said alkaline brine whereby to form a fluoro-apatite.

9. A method of electrolyzing an alkali metal chloride brine containing alkaline earth metal ions as an impurity in an electrolytic cell having an anolyte compartment separated from a catholyte compartment by a semi-permeable barrier which method comprises:
   maintaining the brine alkaline;
   adding a phosphate and a fluoride to said alkaline brine whereby to form a precipitate;
   separating the precipitate from the brine;
   feeding the brine, containing less than 20 parts per billion of alkali earth metal ion, to the anolyte compartment of the cell; and
   passing an electrical current through the cell.

10. The method of claim 9 comprising adding seeding agent to said alkaline brine.

11. The method of claim 10 wherein the seeding agent is chosen from the group consisting of calcium phosphate, calcium fluoro-apatite, calcium hydroxy-apatite, and calcium hydroxide.

12. The method of claim 9 comprising passing the brine through filtering media and recovering a substantially alkaline earth-free brine therefrom.

13. The method of claim 12 wherein said filtering media has a pore size of from about 0.4 to about 1 micron.

14. The method of claim 9 wherein the brine is adjusted to a pH of about 10 prior to addition of the phosphate.

15. The method of claim 9 wherein the phosphate is chosen from the group consisting of phosphoric acid, sodium phosphate, potassium phosphate, and mixtures thereof.

16. The method of claim 9 wherein the fluoride is an alkali metal fluoride.

17. A method of purifying alkali metal chloride brine having an alkali metal chloride content of 225 to 325 grams per liter and containing 200 to 500 parts per billion of calcium ion comprising:
   maintaining the brine alkaline;
   adding a phosphate chosen from the group consisting of phosphoric acid, sodium orthophosphate, sodium metaphosphate, sodium polyphosphate, potassium orthophosphate, potassium metaphosphate, potassium polyphosphate, and mixtures thereof to said alkaline brine whereby to form an insoluble precipitate having the stoichiometric formula $(CaX_2) \cdot (Ca(PO_4)_2)_3$ wherein X is chosen from the group consisting of F, Cl, and OH; and
   separating the insoluble precipitate from the brine.

18. The method of claim 17 comprising adding seeding agent to said alkaline brine.

19. The method of claim 18 wherein the seeding agent is chosen from the group consisting of calcium phosphate, calcium fluoro-apatite, calcium hydroxy-apatite, and calcium hydroxide.

20. The method of claim 17 comprising passing the brine through filtering media and recovering a substantially calcium-free brine therefrom.

21. The method of claim 20 wherein said filtering media has a pore size of from about 0.4 to about 1 micron.

22. The method of claim 17 wherein the brine is adjusted to a pH of about 10 prior to addition of the phosphate.

23. The method of claim 17 wherein the phosphate is chosen from the group consisting of phosphoric acid, sodium phosphate, potassium phosphate, and mixtures thereof.

24. The method of claim 17 comprising adding an alkali metal fluoride to said alkaline brine whereby to form an insoluble precipitate.

25. The method of claim 17 comprising recovering an alkali metal chloride brine containing less than 20 parts per billion of calcium ion.

26. A method of purifying alkali metal chloride brine containing 200 to 500 parts per billion of alkaline earth metal ion comprising:
   maintaining the brine alkaline;
   adding a phosphate and fluoride to said alkaline brine whereby to form a precipitate; and separating the precipitate from the brine.

27. The method of claim 26 comprising adding seeding agent to said alkaline brine.

28. The method of claim 27 wherein the seeding agent is chosen from the group consisting of calcium phosphate, calcium fluoro-apatite, calcium hydroxy-apatite, and calcium hydroxide.

29. The method of claim 26 wherein the alkali metal chloride brine contains from about 225 to about 325 grams per liter of alkali metal chloride.

30. The method of claim 26 wherein the brine is adjusted to a pH of about 10 prior to addition of the phosphate.

31. The method of claim 26 wherein the phosphate is chosen from the group consisting of phosphoric acid, sodium phosphate, potassium phosphate, and mixtures thereof.

32. The method of claim 26 wherein the fluoride is an alkali metal fluoride.

* * * * *